(12) United States Patent
Riva

(10) Patent No.: US 11,691,580 B2
(45) Date of Patent: Jul. 4, 2023

(54) METAL SHOCK ABSORPTION ELEMENT FOR A MOTOR VEHICLE AND RELATED PRODUCTION METHOD

(71) Applicant: SRT S.R.L., Lissone (IT)

(72) Inventor: Alessandro Riva, Arese (IT)

(73) Assignee: SRT S.R.L., Lissone (IT)

( * ) Notice: Subject to any disclaimer, the term of this patent is extended or adjusted under 35 U.S.C. 154(b) by 537 days.

(21) Appl. No.: 16/647,762

(22) PCT Filed: Oct. 5, 2018

(86) PCT No.: PCT/IB2018/057750
§ 371 (c)(1),
(2) Date: Mar. 16, 2020

(87) PCT Pub. No.: WO2019/069281
PCT Pub. Date: Apr. 11, 2019

(65) Prior Publication Data
US 2020/0262374 A1 Aug. 20, 2020

(30) Foreign Application Priority Data

Oct. 5, 2017 (IT) .......................... 102017000111991

(51) Int. Cl.
*B60R 19/34* (2006.01)
*B60R 19/03* (2006.01)
*B60R 19/26* (2006.01)

(52) U.S. Cl.
CPC .............. *B60R 19/34* (2013.01); *B60R 19/03* (2013.01); *B60R 2019/264* (2013.01)

(58) Field of Classification Search
CPC ... B60R 19/34; B60R 19/03; B60R 2019/264; F16F 7/12
(Continued)

(56) References Cited

U.S. PATENT DOCUMENTS 3,997,207 A * 12/1976 Norlin ..................... F16F 7/121
267/140
4,661,030 A 4/1987 Delmastro
(Continued)

FOREIGN PATENT DOCUMENTS

CN 1073402 A 6/1993
CN 1787933 A 6/2006
(Continued)

OTHER PUBLICATIONS

CN Office Action dated Mar. 31, 2021 re: Application No. 201880064543.6, pp. 1-13, citing: US2010127519A1. CN104066625A, US2004262930A1, WO2016035501A1, CN101346259A, CN101428596A, U.S. Pat. No. 4,661,030A, CN1073402A, US2005285417A1 and CN178933A.

(Continued)

*Primary Examiner* — Pinel E Romain
(74) *Attorney, Agent, or Firm* — Cantor Colburn LLP

(57) ABSTRACT

A metal shock absorption element having a first metal sheet and a second metal sheet. The first metal sheet is shaped in the form of a longitudinally open metal profile and has a substantially "C"-shaped cross-section. The second metal sheet is shaped in the form of a longitudinally open metal profile and has a substantially "C"-shaped cross section. The second metal sheet is inserted in a first longitudinal channel of the first metal sheet. The second metal sheet is made integral in one single piece with the first metal sheet in a collection of points to create a metal honeycomb structure having a closed cross-section and metal channels.

13 Claims, 12 Drawing Sheets

(58) Field of Classification Search
USPC .................................. 293/133; 296/187.09
See application file for complete search history.

(56) References Cited

U.S. PATENT DOCUMENTS

| | | | | |
|---|---|---|---|---|
| 6,592,158 | B2 * | 7/2003 | Kettler | B60R 19/18 188/371 |
| 6,971,691 | B1 * | 12/2005 | Heatherington | B60R 19/18 293/154 |
| 7,013,951 | B2 * | 3/2006 | Bauer | B60R 19/48 165/44 |
| 7,163,243 | B2 * | 1/2007 | Evans | B60R 19/18 293/121 |
| 7,651,155 | B2 * | 1/2010 | Tan | B60R 19/34 293/133 |
| 7,793,997 | B2 * | 9/2010 | Karlander | B60R 19/34 293/133 |
| 8,419,040 | B2 * | 4/2013 | Ando | B60D 1/565 280/495 |
| 9,073,496 | B2 * | 7/2015 | Shin | B60R 19/18 |
| 9,290,140 | B2 * | 3/2016 | Matsushiro | B60R 19/34 |
| 9,522,644 | B2 * | 12/2016 | Prasoody | B60R 19/18 |
| 9,731,671 | B2 * | 8/2017 | Ishitsuka | B60R 19/03 |
| 9,855,971 | B2 * | 1/2018 | Daido | B60R 19/02 |
| 2004/0262930 | A1 | 12/2004 | Cumming et al. | |
| 2005/0285417 | A1 | 12/2005 | Glasgow et al. | |
| 2007/0257497 | A1 * | 11/2007 | Heatherington | B60R 19/18 293/120 |
| 2010/0066124 | A1 * | 3/2010 | Terada | B60R 19/34 296/187.09 |
| 2010/0127519 | A1 | 5/2010 | Wakabayashi et al. | |
| 2016/0159300 | A1 * | 6/2016 | Matecki | B60R 19/18 156/60 |
| 2017/0106917 | A1 * | 4/2017 | Mashio | B62D 21/10 |
| 2017/0232917 | A1 | 8/2017 | Akayama et al. | |
| 2018/0057063 | A1 * | 3/2018 | Tyan | B62D 21/00 |
| 2018/0215332 | A1 * | 8/2018 | Garnweidner | B60R 19/24 |
| 2019/0111872 | A1 * | 4/2019 | Newcomb | B60R 19/18 |
| 2019/0217892 | A1 * | 7/2019 | Harpster | B62D 21/152 |

FOREIGN PATENT DOCUMENTS

| | | | |
|---|---|---|---|
| CN | 101346259 A | 1/2009 | |
| CN | 101428596 A | 5/2009 | |
| CN | 104066625 A | 9/2014 | |
| DE | 102015215032 A1 * | 3/2016 | ............ B60R 19/34 |
| WO | 2006012223 A2 | 2/2006 | |
| WO | 2007086787 A1 | 8/2007 | |
| WO | WO-2013017758 A1 * | 2/2013 | ............ B62D 21/02 |
| WO | 2016035501 A1 | 3/2016 | |

OTHER PUBLICATIONS

International Search Report dated Feb. 22, 2019 re: Application No. PCT/IB2018/057750, pp. 1-4, citing: US 2004/0262930 A1, US 2017/0232917 A1, WO 2006/012223 A2, US 2010/0127519 A1, U.S. Pat. No. 4,661,030 A and WO 2007/086787 A1.

Written Opinion dated Feb. 22, 2019 re: Application No. PCT/IB2018/057750, pp. 1-6, citing: US 2004/0262930 A1, US 2017/0232917 A1, WO 2006/012223 A2, US 2010/0127519 A1 and U.S. Pat. No. 4,661,030 A.

* cited by examiner

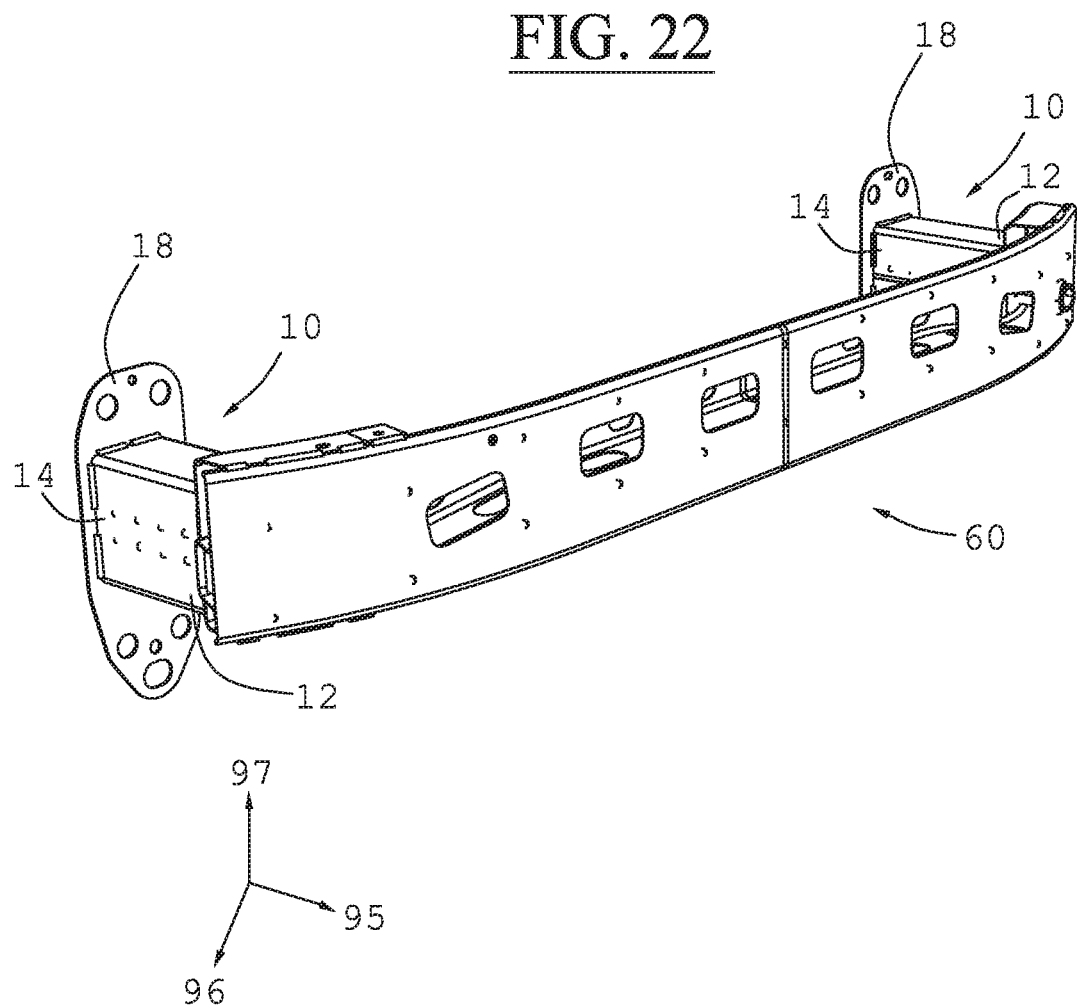

METAL SHOCK ABSORPTION ELEMENT FOR A MOTOR VEHICLE AND RELATED PRODUCTION METHOD

TECHNICAL FIELD

The present disclosure relates to a metal shock absorption element, a bumper structure and a production method of a metal shock absorption element for a motor vehicle.

In particular, the present disclosure relates to a shock absorption element made of steel, starting from at least two sheets of flat sheet metal.

The present disclosure relates, in particular, to the creation of metal shock absorption elements capable of absorbing a shock in the event of an accident, reducing the energy transmitted to a chassis of the same vehicle to a minimum in such a way as to minimise damage to passengers.

BACKGROUND

A first disadvantage of the current methods for producing metal shock absorption elements is that they do not make it possible to easily vary the height of the same without increasing the cost of the moulds, and in many cases this variation is impossible due to problems related to the machinery needed for the production.

Shock absorption systems and bumper structures made of aluminium usually include shock absorption elements made of extruded aluminium elements.

Another disadvantage of the metal shock absorption elements made of aluminium is that they have high weight due to the very high thickness of the shock absorption element's walls due to the production technology which involves extrusion through a plate.

Consequently these elements have a high cost and their high wall thicknesses reduce the shock absorption capacity with this same weight.

Furthermore, they do not allow the section to be varied because the shock absorption elements and the bumper structures are obtained by extrusion.

SUMMARY

The present disclosure provides a metal shock absorption element and a relative bumper structure which have a reduced weight with the same shock absorption capacity.

The present disclosure also provides a production method for a shock absorption element which allows a reduction in production costs and a simplification of the production steps.

The disclosure further provides a metal shock absorption element for a motor vehicle which is stable and which allows a planned deformation, avoiding directly transmitting said shock to the chassis of a vehicle.

The disclosure also creates a metal shock absorption element for a motor vehicle and a relative production method which are simple to produce and make it possible to easily produce metal shock absorption elements, even very wide ones, without requiring large moulds or high-power presses.

The disclosure further provides a metal shock absorption element for a motor vehicle which is low-cost and has a low weight compared to shock absorption elements of large thicknesses, such as those made of extruded aluminium.

The disclosure provides a metal shock absorption element and a relative production method which are economically advantageous.

These advantages according to the present disclosure are achieved by creating a metal shock absorption element for a motor vehicle and a relative production method as set forth in the independent claims.

Further characteristics of the disclosure are highlighted by the dependent claims.

BRIEF DESCRIPTION OF THE DRAWINGS

The features and advantages of a metal shock absorption element for a motor vehicle and a relative production method according to the present disclosure will be more apparent from the following description, which is to be understood as exemplifying and not limiting, with reference to the schematic attached drawings, wherein:

FIG. 22 is a perspective view from above in left side elevation of the bumper structure of FIG. 19.

DETAILED DESCRIPTION OF THE DRAWINGS

Figure 1:
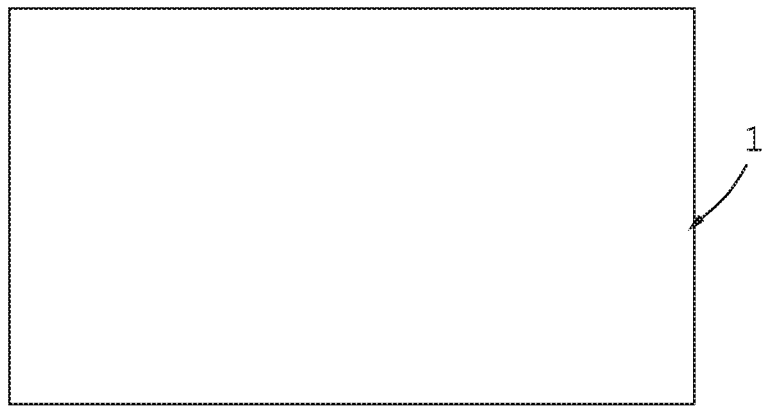
FIG. 1 is a view from above of a first metal sheet.

With reference to the figures, a metal shock absorption element 10 is shown comprising a first metal sheet 1 and a second metal sheet 2, wherein said first metal sheet 1 is shaped in the form of a longitudinally open metal profile and having a substantially "C"-shaped cross-section, and wherein said second metal sheet 2 is shaped in the form of a longitudinally open metal section and having a substantially "C"-shaped cross-section.

In particular, said first metal sheet 1 is folded in the shape of a longitudinally open metal profile, in particular having at least five metal walls, and preferably having an open and substantially rectangular cross-section.

In particular, said second metal sheet 2 is folded in the shape of a longitudinally open metal profile, in particular having at least five metal walls, and preferably having an open and substantially rectangular cross-section.

Preferably, said first metal sheet 1 comprises a plurality of particularly longitudinal and preferably high-resistance folds, which connect a plurality of adjacent metal walls of the same, and wherein each fold defines an angle or a roughened corner of said first metal sheet 1 shaped in the form of said first longitudinally open metal profile.

Preferably, said second metal sheet 2 comprises a plurality of particularly longitudinal and preferably high-resistance folds, which connect a plurality of adjacent metal walls of the same, and wherein each fold defines an angle or a roughened corner of said second metal sheet 2 shaped in the form of said second longitudinally open metal profile.

According to the present disclosure, said second metal sheet 2 is inserted within a first longitudinal channel 1G of said first metal sheet 1, moreover said second metal sheet 2 is made integral in one piece with said first metal sheet 1, in particular in a plurality of points 2S and preferably along at least two opposite sides to each other, to create a metal honeycomb structure having a closed cross-section and having a plurality of metal channels, in particular having at least three metal channels.

In particular, said metal honeycomb structure comprises a plurality of metal channels, at least three metal channels, which extend along said direction of development 98 which is parallel or inclined with respect to a longitudinal direction 95, in particular which is perpendicular to a transverse direction 96, which in turn is perpendicular to a vertical direction 97 which is also perpendicular to said longitudinal direction.

Preferably, said second metal sheet 2 comprises a second longitudinal channel 2G and is inserted within said first longitudinal channel 1G of said first metal sheet 1 in a substantially central position for dividing said first longitudinal channel 1G into a plurality of metal channels and preferably into at least three longitudinal metal channels for creating said metal honeycomb structure.

Moreover, said second metal sheet 2 is preferably inserted within said first longitudinal channel 1G of said first metal sheet 1 such that a first side opening 1F of said first metal sheet 1 is opposite a second side opening 2F of said second metal sheet 2, in particular with respect to a central point of said cross-section, to create a metal honeycomb structure having a closed and preferably symmetrical cross-section.

Advantageously, this makes it possible to have a metal shock absorption element 10 having a metal honeycomb structure in a single piece having a closed and preferably symmetrical cross-section with respect to a central point.

Advantageously, this makes it possible to have reduced weight and increased stability during a shock in order to absorb greater energy at the same weight.

Preferably, said first metal sheet 1 has external transverse dimensions which are slightly greater than an external transverse dimension of said second metal sheet 2 to allow the insertion of said second metal sheet 2 inside said first metal sheet 1 such that said second metal sheet 2 has the walls of two opposite sides in contact with the walls of two opposite sides of said first metal sheet 1, in other words said first metal sheet 1 has external transverse dimensions which are substantially equal to the sum of twice the thickness of the walls of said first metal sheet 1 added to the external transverse dimensions of said second metal sheet 2.

Preferably, said first metal sheet 1 comprises a first wall 1A, a second wall 1B and a third wall 1C which extend perpendicularly from said first wall 1A, and further comprises a fourth wall 1D which extends perpendicularly to said second wall 1B, and furthermore it comprises a fifth wall 1E which extends perpendicularly to said third wall 1C, and wherein said fourth wall 1D and said fifth wall 1E are parallel to said first wall 1A for creating said open, substantially "C"-shaped cross-section, and wherein said fourth wall 1D and said fifth wall 1E define a side opening 1F having in particular a transverse width of 10 mm and in particular of 4 mm.

Preferably said first metal sheet 1 is a folded metal sheet having a tubular shape with a substantially rectangular cross-section open longitudinally and transversely.

Preferably each wall of said plurality of walls (1A, 1B, 1C, 1D, 1E) has a flat, smooth surface, in particular without protuberances or reliefs or any wavy patterns.

Preferably, said second metal sheet 2 comprises a first wall 2A, a second wall 2B and a third wall 2C which extend perpendicularly from said first wall 2A, and further comprises a fourth wall 2D which extends perpendicularly to said second wall 2B, and furthermore it comprises a fifth wall 2E which extends perpendicularly to said third wall 2C, and wherein said fourth wall 2D and said fifth wall 2E are parallel to said first wall 2A for creating said open, substantially "C"-shaped cross-section, and wherein said fourth wall 2D and said fifth wall 2E define a side opening 2F having in particular a transverse width of 10 mm and in particular of 4 mm.

Preferably said second metal sheet 2 is a folded metal sheet having a tubular shape with a substantially rectangular cross-section open longitudinally and transversely.

Preferably each wall of said plurality of walls (2A, 2B, 2C, 2D, 2E) has a flat, smooth surface, in particular without protuberances or reliefs or any wavy patterns.

Preferably said first wall 1A of said first metal sheet 1 is coupled to said fourth 2D and said fifth wall 2E of said second metal sheet 2, moreover preferably said first wall 2A of said second metal sheet 2 is coupled to said fourth wall 1D and said fifth wall 1E of said first metal sheet 1.

Preferably, said second metal sheet 2 is made integral in one piece with said first metal sheet 1, in particular in a plurality of points 2S which are preferably distributed along at least two opposite walls of said first metal sheet 1 and of said second metal sheet 2 which face each other, and in particular are mutually joined, and wherein preferably said plurality of points 2S is a plurality of welding points in particular without the addition of material, i.e. by casting the material of said first metal sheet and said second metal sheet 2 in a plurality of points.

Preferably said plurality of points comprises at least one matrix of welding points 2S which are preferably made inside said fourth 2D and said fifth wall 2E of said second metal sheet 2 in order to join the same in a single piece with said first wall 1A, and furthermore, which are made inside said first wall 2A in order to join the same in a single piece with said fourth wall 1D and said fifth wall 1E.

Preferably, said metal shock absorption element 10 comprises a first open front end 12 and a second rear end 14, wherein said first open front end 12 is inclined with respect to a transverse direction 96 and in particular is not perpendicular to a direction of extension 98 of said metal honeycomb structure.

Preferably, said metal shock absorption element 10 comprises a plurality of notches which are made at said first open front end 12 and in particular which are made on said first metal sheet 1 which in particular is more external with respect to said second metal sheet 2.

Preferably, said first metal sheet 1 comprises a plurality of metal fixing walls 1T which extend from said plurality of walls (1A, 2A, 3A, 4A, 5A) at said first open front end 12, to fix said shock absorption element to a metal crosspiece 60.

Alternatively, said plurality of metal fixing walls 1T can be made on said second metal sheet 2 at said first open front end 12.

Preferably at least a part of said plurality of metal fixing walls 1T is inclined with respect to a direction of extension 98 of said metal honeycomb structure to favour the start of a plurality of planned folds of said metal shock absorption element 10, starting from said first open front end 12.

Preferably said plurality of metal fixing walls 1T are made in a single piece with said metal sheet 1.

Preferably said metal shock absorption element 10 comprises a metal fixing plate 18 which is made integral, in particular which is welded or brazed, to said first metal sheet 1 at said second rear end 14 in particular for fixing said second rear end 14 of said metal shock absorption element 10 to a chassis of a motor vehicle and in particular to a longitudinal beam of a vehicle.

In particular, said metal fixing plate 18 is welded and preferably brazed to said plurality of walls (1A, 1B, 1C, 1D, 1E) of said first metal sheet 1 in a plurality of zones 1S.

Preferably, said first metal sheet 1 and said at least one second metal sheet 2 have a thickness lower than 2 mm and in particular lower than 1.6 mm.

Preferably, said first metal sheet 1 has a thickness lower than 2 mm and in particular comprised between 0.8 mm and 1.4 mm and even more particularly comprised between 1 mm and 1.2 mm.

Preferably, said second metal sheet 2 has a thickness lower than 2 mm and in particular comprised between 0.8 mm and 1.6 mm and even more particularly comprised between 0.6 mm and 1.4 mm.

Moreover, preferably said first metal sheet 1 and said second metal sheet 2 are made of steel, in particular a steel having two crystalline phases, a first martensitic phase and a second ferritic phase, preferably a type of steel having an elongation at break of substantially 7%, such as in particular a two-phase steel, for example known with the commercial code DP 1000, in particular a carbon steel having in particular the following composition:

a maximum percentage of Carbon comprised between 0.14%-0.23% C,
a maximum percentage of Silicon of 0.80% Si,
a maximum percentage of Manganese comprised between 2.0%-2.50% Mn,
preferably a maximum percentage of Phosphorus of 0.080% P,
preferably a maximum percentage of Sulphur of 0.015% S,
preferably a maximum percentage of Aluminium of 2.00% Al,
preferably a maximum percentage of Chromium and Molybdenum of 1.00% Cr+Mo,
preferably a maximum percentage of Niobium and Titanium of 0.15% Nb+Ti,
preferably a maximum percentage of Vanadium of 0.20% V,
preferably a maximum percentage of Boron of 0.005% B.

Figure 2:
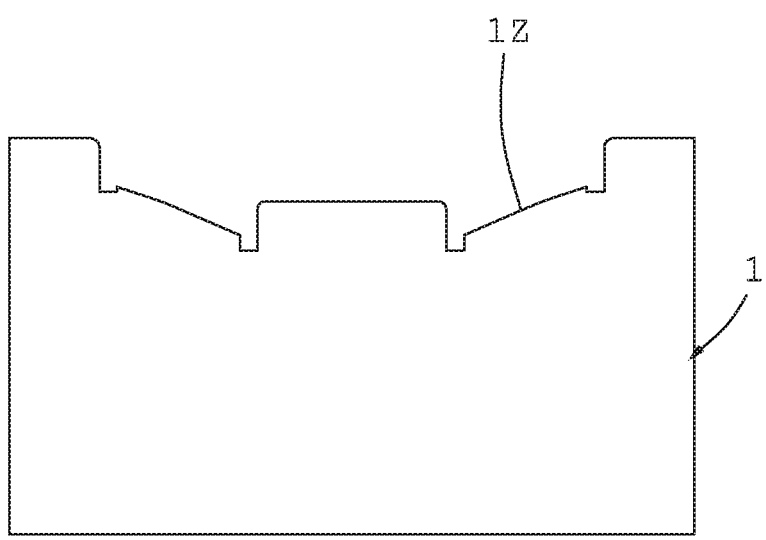
FIG. 2 is a view from above of a first shaped metal sheet according to the present disclosure.
Figure 3:
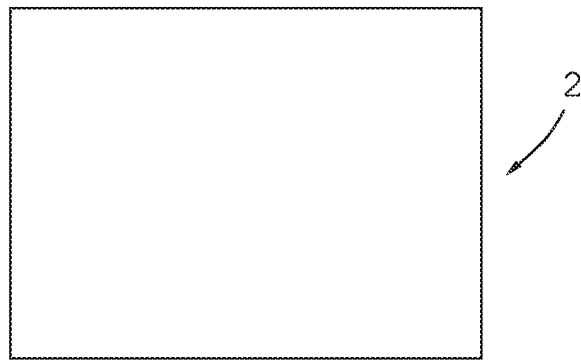
FIG. 3 is a view from above of a second metal sheet.

With reference to FIG. 2, preferably said first metal sheet 1 comprises at least one first sheared side 1Z having a profile shaped for making a plurality of metal fixing elements and preferably for making a plurality of notches.

Furthermore, preferably said at least one first sheared side 1Z has a profile shaped to allow the creation of a first open front end 12 which is inclined with respect to said transverse direction 96 and in particular which is not perpendicular to a direction of extension 98 of said metal honeycomb structure, advantageously to allow the start of a plurality of planned folds starting from said first open front end 12.

This advantageously makes it possible to avoid making a plurality of metal fixing elements through laser cutting, advantageously reducing the overall cost of said metal shock absorption element 10.

Moreover, this advantageously makes it possible to create a plurality of notches to avoid the deformation of a plurality of walls of said first metal sheet 1 following the folding of said second metal sheet 1.

Figure 4:
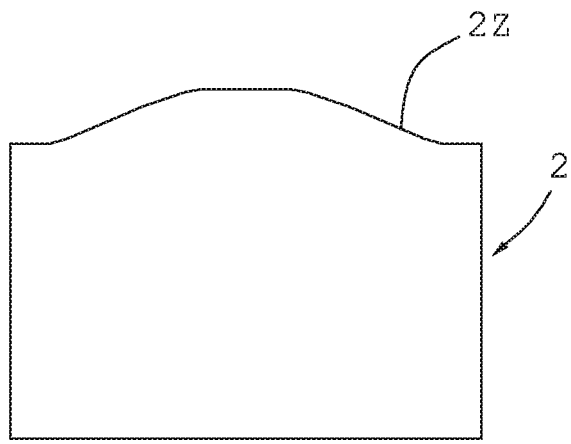
FIG. 4 is a view from above of a second shaped metal sheet according to the present disclosure.
Figure 5:
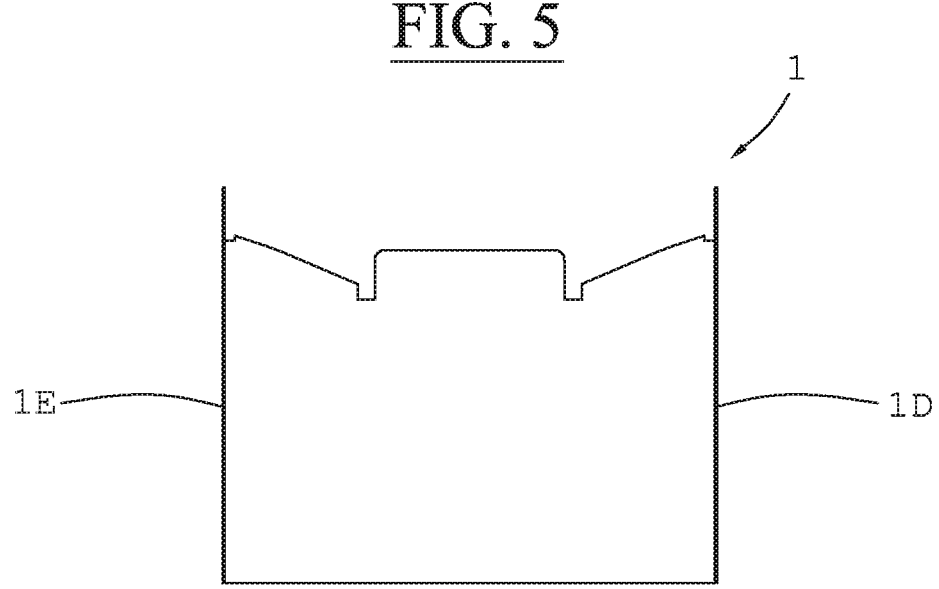
FIG. 5 is a view from above of the first metal sheet, folded.
Figure 6:
FIG. 6 is a front elevation view of the first folded metal sheet of FIG. 5.
Figure 7:
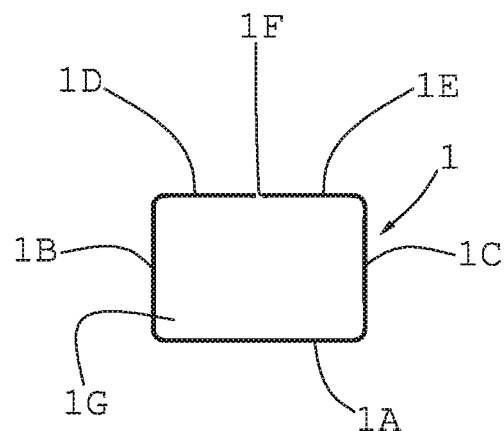
FIG. 7 is a view from above of the first folded metal sheet of FIG. 5, folded a plurality of times and shaped like a metal profile.
Figure 8:
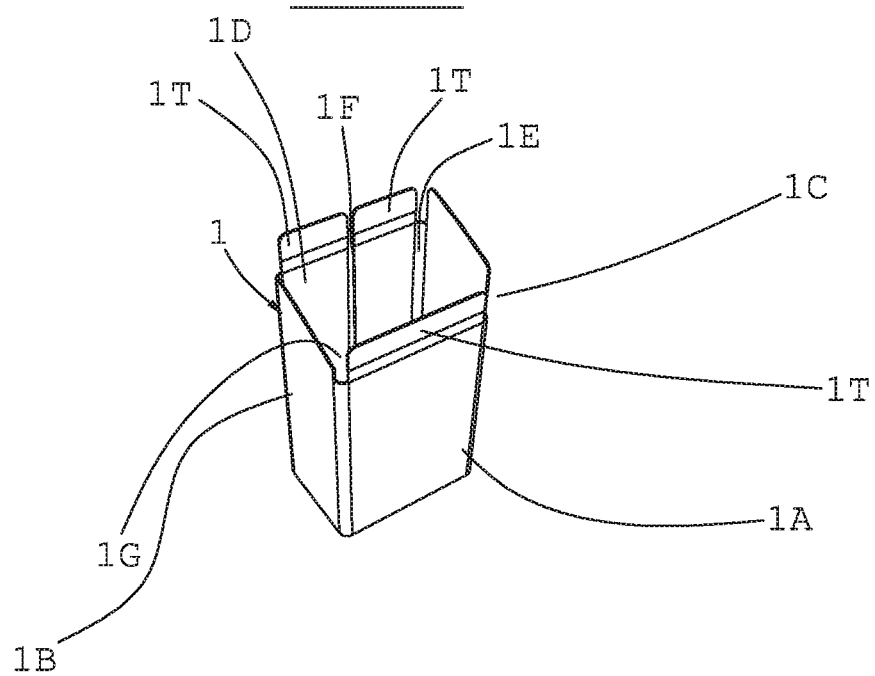
FIG. 8 is a perspective view in left-side elevation of the first metal sheet, shaped like a metal profile in FIG. 7.
Figure 9:
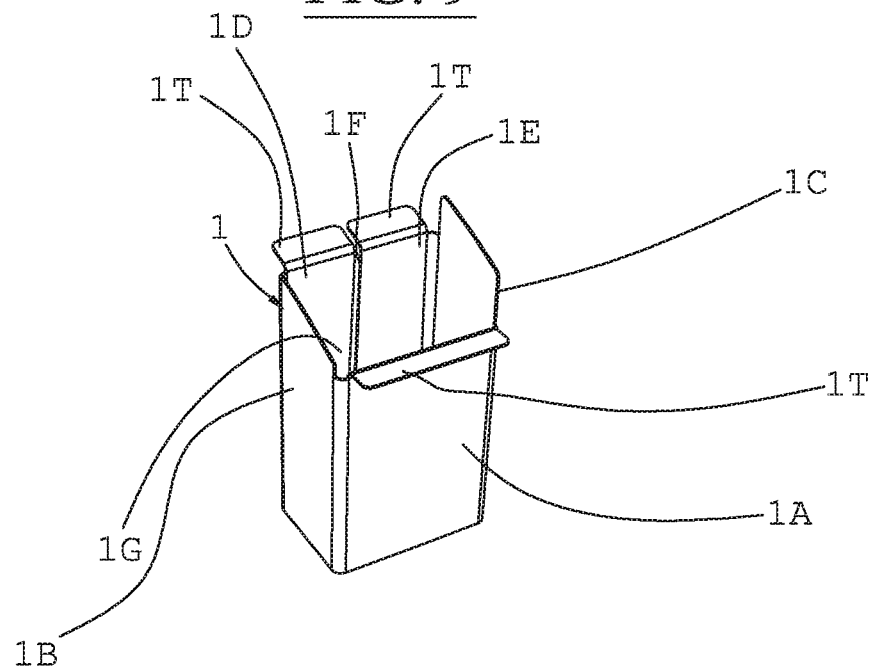
FIG. 9 is a perspective view in left side elevation of the first metal sheet shaped like a metal profile of FIG. 7 according to a further embodiment.
Figure 10:
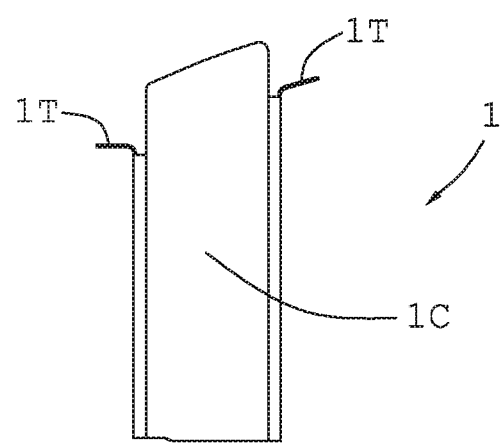
FIG. 10 is right side elevation view of the first metal sheet of FIG. 9.
Figure 11:
FIG. 11 is a front elevation view of the second folded metal sheet.
Figure 12:
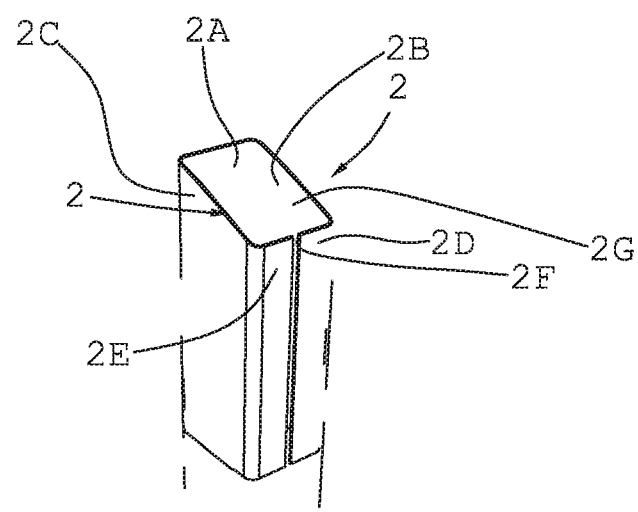
FIG. 12 is a perspective view in left side elevation of the second metal sheet of FIG. 11, folded a plurality of times and shaped like a second metal profile.
Figure 13:
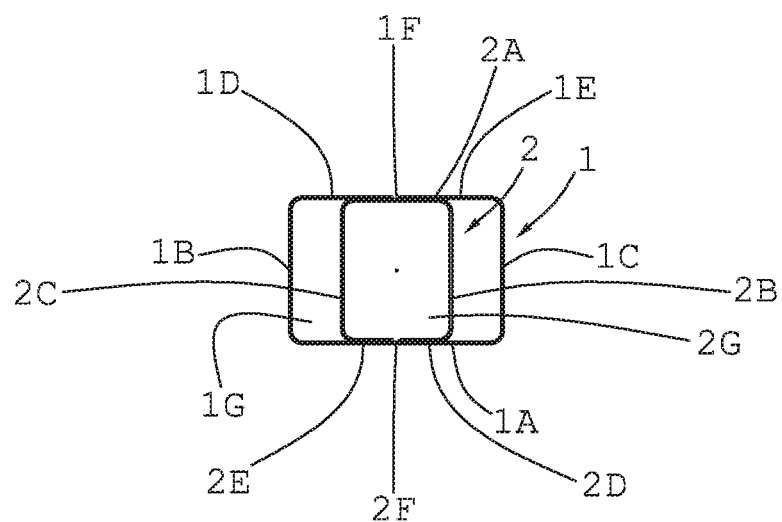
FIG. 13 is a view from above of the second metal sheet of FIG. 12, inserted in the first metal sheet of FIG. 9.
Figure 14:
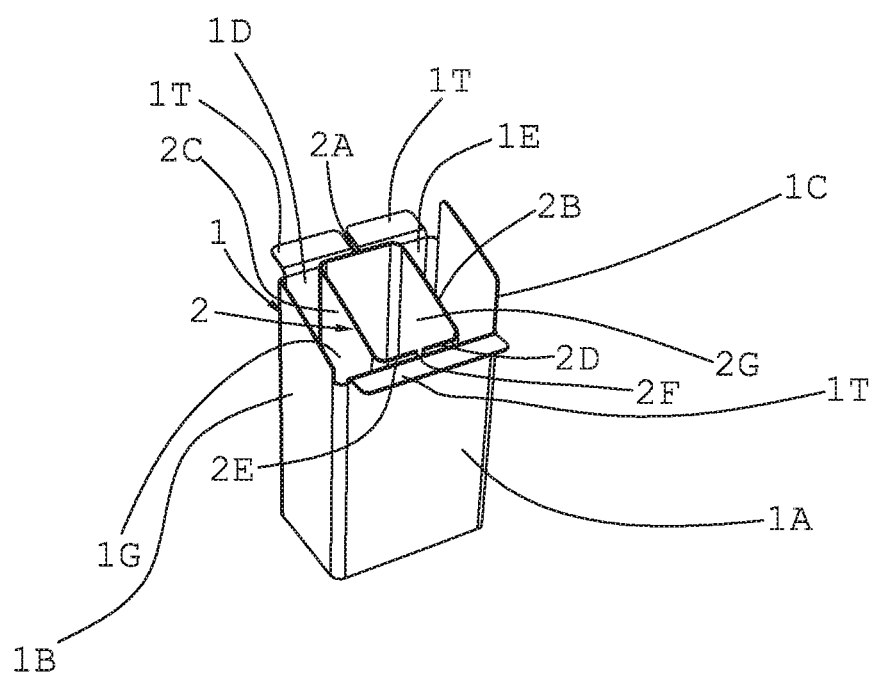
FIG. 14 is a perspective view in left side elevation of FIG. 13.
Figure 15:
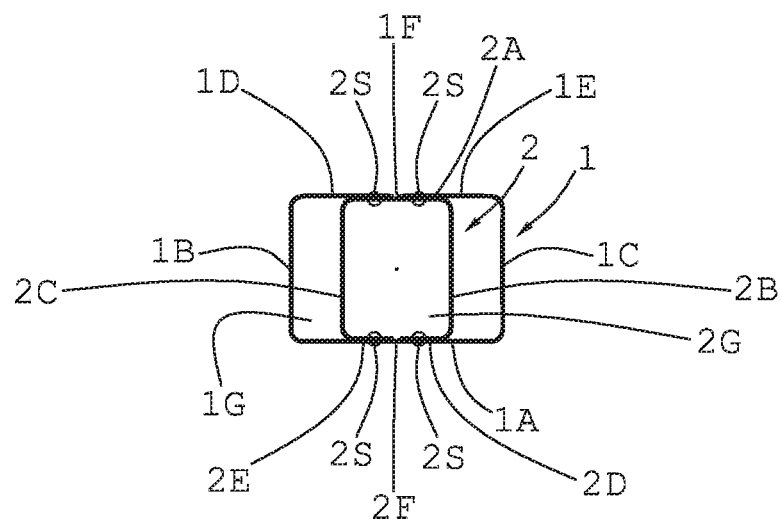
FIG. 15 is a view from above of FIG. 13, wherein the first metal sheet is made integral in a single piece with the second metal sheet.
Figure 16:
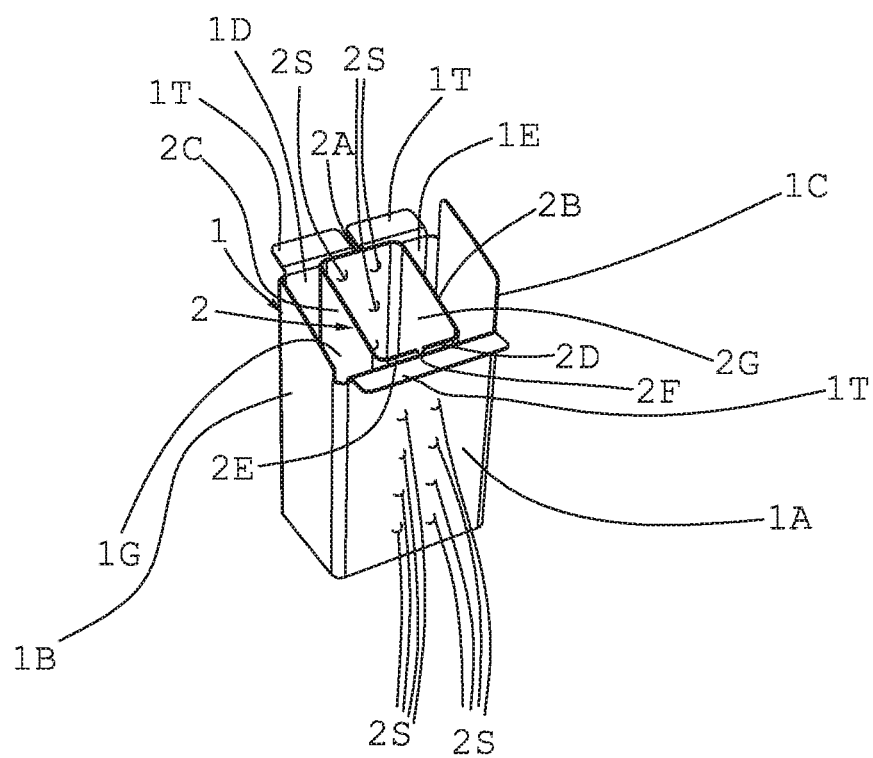
FIG. 16 is a perspective view in left side elevation of FIG. 15.
Figure 17:
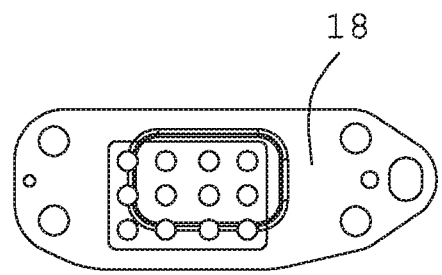
FIG. 17 is a view from below of a preferred embodiment of a metal fixing plate according to the present disclosure.
Figure 18:
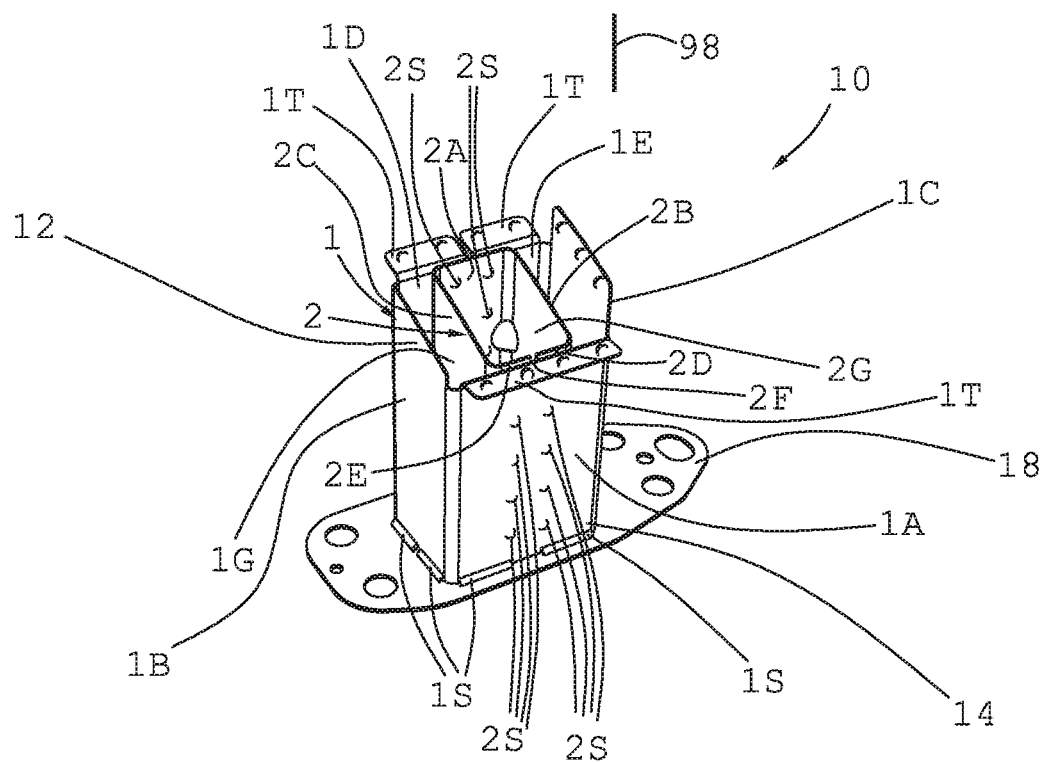
FIG. 18 is a perspective view from above of the left side elevation of a preferred embodiment of a metal shock absorption element according to the present disclosure.
Figure 19:
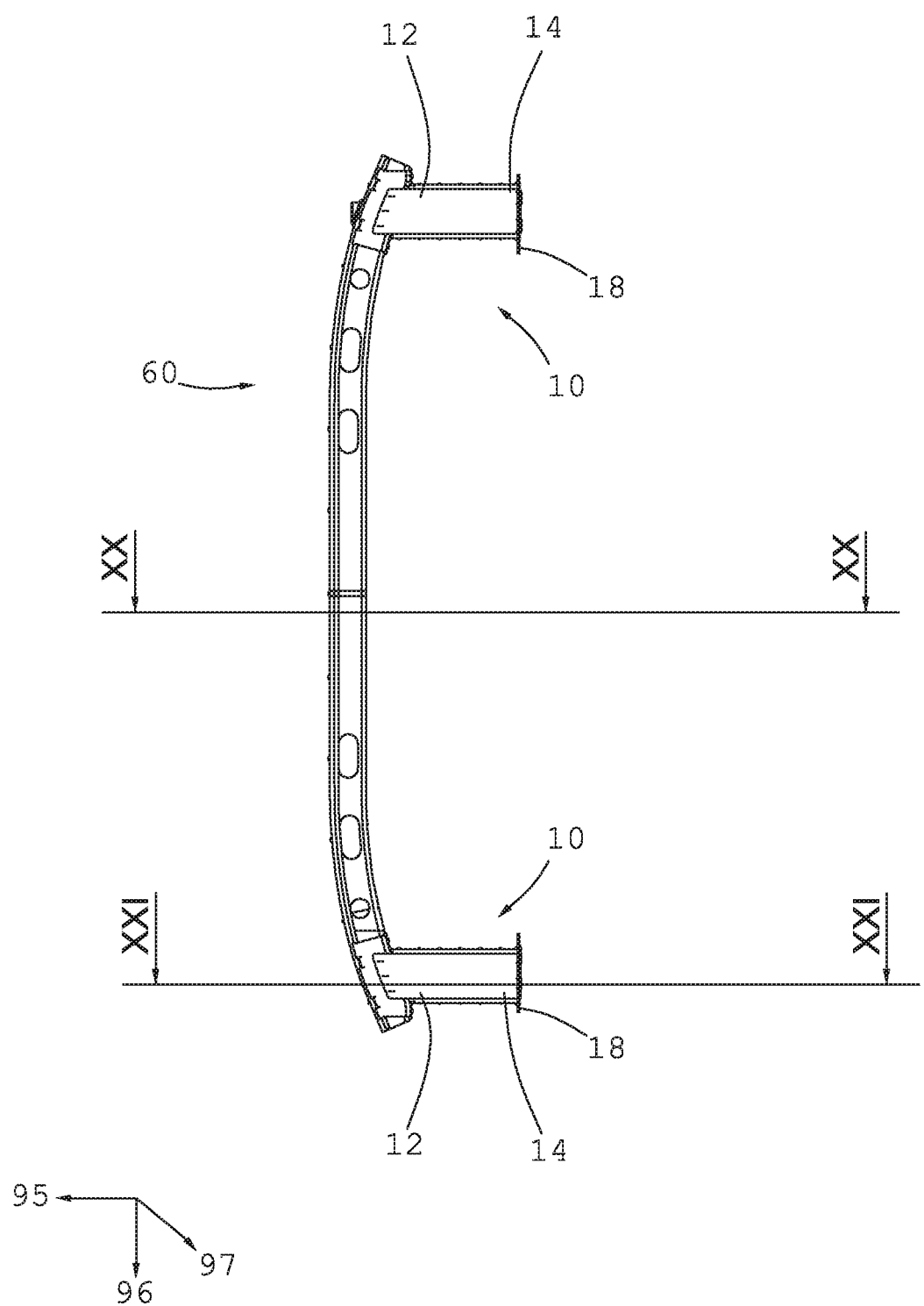
FIG. 19 is a view from above of a preferred embodiment of a bumper structure for a motor vehicle according to the present disclosure.
Figure 20:
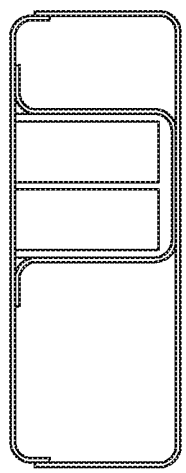
FIG. 20 is a view of the right side elevation of a detail of the bumper structure of FIG. 19, sectioned according to the XX-XX line.
Figure 21:
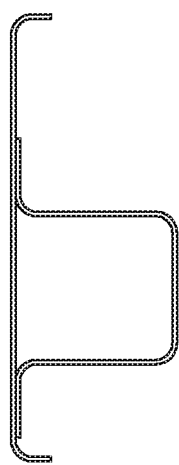
FIG. 21 is a view of the right side elevation of a detail of the bumper structure of FIG. 19, sectioned according to the XXI-XXI line.

With reference to FIG. 4, preferably said second metal sheet 2 comprises at least one second sheared side 2Z having a profile shaped for making a first open front end 12 which is inclined with respect to a transverse direction 96 and in particular for making a plurality of notches and/or preferably for making a plurality of metal fixing elements.

Furthermore, preferably said at least one second sheared side 2Z has a profile shaped to allow the creation of a first open front end 12 which is inclined with respect to said transverse direction 96 and in particular which is not perpendicular to a direction of extension 98 of said metal honeycomb structure, advantageously to allow the start of a plurality of planned folds starting from said first open front end 12.

This advantageously makes it possible to avoid making a series of cuts with a laser, advantageously reducing the overall cost of said metal shock absorption element 10 reducing the overall cost of said metal shock absorption element 10.

According to another aspect of the present disclosure, a production method is provided for a metal shock absorption element 10 having an alveolar structure which comprises at least two metal shock absorption elements 10, in particular having one or more previously described characteristics, starting from a first metal sheet 1, in particular substantially flat and preferably substantially rectangular, and from a second metal sheet 2, in particular substantially flat and preferably substantially rectangular, wherein said method comprises the following steps:

A) bending said first preferably shaped metal sheet 1 a plurality of times to obtain a first longitudinally open metal profile having a substantially "C"-shaped cross-section and in particular having an open rectangular shape, and further comprising a step of B) folding said preferably shaped second metal sheet 2 a plurality of times to obtain a second longitudinally open metal profile having a substantially "C"-shaped cross-section, and in particular having an open rectangular shape.

Preferably said step A) comprises a step A1) of creating a plurality of metal walls, in particular at least five metal walls (1A, 1B, 1C, 1D, 1E).

Preferably, said step A1) envisages the creation of a first wall 1A, a second wall 1B and a third wall 1C which extend perpendicularly from said first wall 1A, and a further fourth wall 1D which extends perpendicularly to said second wall 1B, and furthermore a fifth wall 1E which extends perpendicularly to said third wall 1C, and wherein said fourth wall 1D and said fifth wall 1E are parallel to said first wall 1A, in particular for creating said open substantially "C"-shaped cross-section, and wherein said fourth wall and said fifth wall define a side opening 1F having in particular a transverse width of 10 mm and in particular of 4 mm.

Preferably said step B) comprises a step B1) of creating a plurality of metal walls, in particular at least five metal walls (2A, 2B, 2C, 2D, 2E).

Preferably, said step A1) envisages the creation of a first wall 2A, a second wall 2B and a third wall 2C which extend perpendicularly from said first wall 2A, and a further fourth wall 2D which extends perpendicularly to said second wall 2B, and furthermore a fifth wall 2E which extends perpendicularly to said third wall 2C, and wherein said fourth wall 2D and said fifth wall 2E are parallel to said first wall 2A, in particular for creating said open substantially "C"-shaped cross-section, and wherein said fourth wall and said fifth wall define a side opening 2F having in particular a transverse width of 10 mm and in particular of 4 mm.

Preferably said step A) comprises a step A2) of creating a plurality of particularly longitudinal and preferably high-strength folds which connect a plurality of adjacent metal walls (1A, 1B, 1C, 1D, 1E), and wherein each fold defines an angle or a roughened corner of said first longitudinally open metal profile.

Preferably said step B) comprises a step B2) of creating a plurality of particularly longitudinal and preferably high-resistance folds which connect a plurality of adjacent metal walls (2A, 2B, 2C, 2D, 2E), and wherein each fold defines an angle or a roughened corner of said second longitudinally open metal profile.

Preferably, said method comprises a step C) of longitudinally inserting said second metal profile inside said first metal profile, in particular in a first longitudinal channel 1G of said first metal profile, in particular with a cross-section of said second metal profile rotated 180° with respect to a cross-section of said second metal profile, and in particular comprising a step C1) of positioning a first side opening 1F of said first metal profile and a second side opening 2F of said second metal profile respectively in diametrically opposed positions with respect to a central point of said cross-section to create a metal honeycomb structure having a closed and preferably symmetrical cross-section.

Preferably, said method further comprises a step C2) of superimposing at least two metal walls of said first metal profile and said second metal profile, in particular for each of the two opposite sides, in particular coupling at least two opposite walls to each other of said first metal sheet 1 and said second metal sheet 2, which face each other.

Preferably, said method comprises a step C3) of dividing a first longitudinal channel 1G of said first metal profile in a plurality of metal channels and preferably in at least three longitudinal metal channels and in particular a step C4) of inserting said second metal profile centrally to said first longitudinal channel 1G of said first metal profile.

Preferably, said method comprises a step D) of making said second metal sheet 2 integral to said first metal sheet 1 in a single piece, in particular in a plurality of points 2S which are preferably distributed along at least two opposite walls of said first metal sheet 1 and said second metal sheet 2 which face each other, and in particular which mutually join together to produce a metal honeycomb structure having a closed cross-section and having a plurality of metal channels, in particular having at least three metal channels.

Advantageously, this makes it possible to have a metal shock absorption element 10 having a metal honeycomb structure in a single piece having a closed and preferably symmetrical cross-section with respect to a central point.

Advantageously, this makes it possible to have reduced weight and increased stability during a shock in order to absorb greater energy at the same weight.

Preferably, said step D) comprises a step D1) of welding along a plurality of longitudinal directions in a plurality of points 2S said first metal profile to said second metal profile, creating a metal shock absorption element 10 in one piece and having a metal honeycomb structure comprising at least three longitudinal channels.

Preferably, said step D1) comprises a step D2) of welding at points, in particular through $CO_2$, said second metal profile to said first metal profile, making a plurality of welds at points 2S in particular on walls of the same which overlap, and preferably along at least two opposite sides, in particular without the addition of material, and in particular comprising a step D3) of casting said first metal profile to said second metal profile in a plurality of points 2S.

Preferably, said step D1) comprises a step D3) of internally welding said first metal profile to said second metal profile, making a plurality of welds at points 2S.

Preferably, said step D1) comprises a step D4) of creating a matrix of welding points 2S in particular inside said second metal sheet 2 for joining the same in a single piece with said first metal sheet 1.

Preferably, said step D1) comprises a step D5) of welding in a plurality of points 2S a fourth wall 2D and a fifth wall 2E of said second metal sheet 2 with a first wall 1A of said first metal sheet 1 to join the same in one single piece, and further welding in a plurality of points 2S a first wall 2A of said second metal sheet 2 with a fourth wall 1D and a fifth wall 1E of said first metal sheet 1 to join them in one single piece.

Preferably, said method comprises a step E) of keeping a plurality of walls of said first metal profile and said second metal profile flat and smooth.

Preferably, said method comprises a step H1) of shaping said first metal sheet 1 to obtain a first shaped metal sheet 1 having along a first open proximal end 12 at least two metal fixing tabs and at least two diagonal lines; wherein said phase H1 is carried out before said phase A), advantageously to reduce production costs, and further comprises a step L1) of shaping said second metal sheet 2 to obtain a second shaped metal sheet 2 having along a first open proximal end 12 at least two diagonal lines; wherein said phase L1) is carried out before said phase B), advantageously to reduce production costs.

Preferably said step H1) comprises a step H2) of shearing said first metal sheet 1, simultaneously producing at least one metal fixing element for fixing a metal crosspiece 60 and at least one notch preferably adjacent to at least one metal fixing element.

Preferably said step H1) comprises a step H2) of shearing said first metal sheet 1, simultaneously producing a plurality of metal fixing walls 1T for fixing a metal crosspiece 60 and a plurality of notches, each of which is preferably adjacent to at least one metal fixing wall 1T.

This advantageously makes it possible to avoid making a plurality of metal fixing elements or metal walls through laser cutting, advantageously reducing the overall cost of said metal shock absorption element 10.

Moreover, this advantageously makes it possible to create a plurality of notches to avoid the deformation of a plurality of walls of said first metal sheet 1 following the folding of said second metal sheet 2.

Preferably, said step L1) comprises a step L2) of shearing said second metal sheet 2, simultaneously creating a plurality of diagonal lines to form a first open front end 12 which is inclined with respect to the transverse direction 96, and in particular providing a plurality of notches and/or preferably by making a plurality of metal fixing elements for said metal crosspiece 60.

This advantageously makes it possible to avoid making a plurality of metal fixing elements through laser cutting, advantageously reducing the overall cost of said metal shock absorption element 10.

Moreover, this advantageously makes it possible to create a plurality of notches to avoid the deformation of a plurality of walls of said second metal sheet 2 following the folding of said second metal sheet 2.

Preferably, said first metal profile comprises at least one notch made at two adjacent faces at said first open proximal end 12.

In particular, said at least one notch is positioned at a corresponding tab or fixing flange for a metal crosspiece 60.

According to another aspect of the present disclosure, at least one mould and/or equipment for creating at least one metal shock absorption element 10 having one or more of the previously described characteristics or according to one or more of the previously described embodiments is provided.

According to another aspect of the present disclosure, a bumper structure is provided for a motor vehicle which comprises at least two metal shock absorption elements 10 having one or more of the previously described characteristics or according to one or more of the previously described embodiments, and further comprising a metal crosspiece 60 having a substantially rectangular cross-section and formed by two "C"-shaped metal profiles welded to each other in a manner, and a polymeric outer bumper casing, not shown in the figures, having only an aesthetic function to cover said metal crosspiece 60 and said at least two polymeric shock absorption elements 10.

Preferably said metal crosspiece 60 comprises two substantially flat base portions, each of which is fixed to or made integral with a corresponding first open front end 12 of each metal shock absorption element, and in particular is made integral in one single piece with a plurality of metal fixing walls 1T, advantageously avoiding the direct fixing of said metal crosspiece 60.

Preferably said metal crosspiece 60 comprises at each metal shock absorption element 10 one comprising a metal element having a substantially "Ω"-shaped cross-section which is welded or in any case made integral within said metal crosspiece to further stiffen in a localised zone said metal crosspiece 60, thereby reducing the weight and the overall cost, which would be impossible with extruded metal profiles, for example of aluminium, which have the same section along their entire length.

Advantageously, in this way it is possible to create a metal bumper structure in one single piece with high shock absorption characteristics accompanied by a reduced weight and cost.

Advantageously, this gives said at least one polymeric shock absorption element 10 greater stability, and therefore also gives said bumper structure greater stability.

Preferably said metal crosspiece 60 is made of steel, in particular a type of steel having two crystalline phases, a first martensitic phase and a second ferritic phase, preferably a type of steel having an elongation at break of substantially 7%, such as in particular a two-phase steel, for example known with the commercial code DP 1000, in particular a carbon steel having in particular the composition described above.

According to another aspect of the present disclosure, at least one mould and one apparatus are provided for making a crosspiece 60 and for a bumper structure having one or more of the previously described characteristics or according to one or more of the previously described embodiments.

According to another aspect of the present disclosure, an apparatus is provided comprising a plurality of moulds for making a bumper structure comprising a crosspiece 60 and a plurality of metal shock absorption elements having one or more of the previously described characteristics or according to one or more of the previously described embodiments.

According to another aspect of the present disclosure, a chassis for a motor vehicle is provided comprising at least one metal shock absorption element 10 having one or more of the previously described characteristics or according to one or more of the previously described embodiments and preferably comprising a metal crosspiece 60 having one or more of the previously described characteristics or according to one or more of the previously described embodiments.

According to another aspect of the present disclosure, a motor vehicle is provided comprising a metal shock absorption element 10 having one or more of the previously described characteristics or according to one or more of the previously described embodiments, and in particular comprising a bumper structure, preferably front or rear, having one or more of the previously described characteristics or according to one or more of the previously described embodiments.

Moreover, said motor vehicle preferably comprises a chassis, an engine connected to said chassis, at least three wheels, in particular at least four wheels, of which at least one front wheel, and a passenger compartment.

It has thus been seen that a metal shock absorption element for a motor vehicle and a relative production method according to the present disclosure accomplish the previously highlighted objects.

The metal shock absorption element for a motor vehicle and the relative production method of the present disclosure thus conceived are susceptible to numerous modifications and variations, all of which fall under the same inventive concept.

Furthermore, in practice the materials used, as well as their dimensions and components, can be of any type according to the technical requirements.

The invention claimed is:

1. A metal shock absorption element comprising: a first metal sheet and a second metal sheet, wherein said first metal sheet is shaped in the form of a longitudinally open metal profile and having a substantially "C"-shaped cross-section and wherein said second metal plate is shaped in the form of a longitudinally open metal profile and having a substantially "C"-shaped cross section, wherein said second metal sheet is inserted in a first longitudinal channel of said first metal sheet, said second metal sheet is integral in one single piece with said first metal sheet in a plurality of points to create a metal honeycomb structure having a closed cross-section and having a plurality of metal channels, wherein said first metal sheet comprises a first wall, a second wall, and a third wall which extend perpendicularly from said first wall, and further comprises a fourth wall which extends perpendicularly to said second wall, and further comprises a fifth wall which extends perpendicularly to said third wall, and wherein said fourth wall and said fifth wall are parallel to said first wall to create said open, substantially "C"-shaped cross-section, and wherein said fourth wall and said fifth wall define a side opening having in particular a transverse width of 10 mm and in particular of 4 mm, said second metal sheet comprises a first wall, a second wall, and a third wall which extend perpendicularly from said first wall, and further comprises a fourth wall which extends perpendicularly to said second wall, and further comprises a fifth wall which extends perpendicularly to said third wall, and wherein said fourth wall and said fifth wall are parallel to said first wall to create said open and substantially "C"-shaped cross-section, and wherein said fourth wall and said fifth wall define a side opening having in particular a transverse width of 10 mm and in particular of 4 mm, wherein said first metal sheet comprises a plurality of metal fixing walls which extend from said plurality of walls at a first open front end, to fix said shock absorption element to a metal crosspiece, wherein at least a part of said plurality of metal fixing walls T) are inclined with respect to a direction of extension of said metal honeycomb structure to favour starting of a plurality of programmed folds of said metal shock absorption element, starting from said first open front end.

2. The metal shock absorption element according to claim 1, wherein said second metal sheet is inserted within said first longitudinal channel of said first metal sheet such that a first side opening of said first metal sheet is opposite a second side opening of said second metal sheet, in particular with respect to a central point of said cross-section, to create a metal honeycomb structure having a closed and preferably symmetrical cross-section.

3. The metal shock absorption element according to claim 1, wherein said plurality of points is distributed along at least two opposite walls of said first metal sheet and said second metal sheet facing each other and wherein said plurality of points is a plurality of welding points.

4. The metal shock absorption element according to claim 1, wherein said metal shock absorption element comprises a first front end and a second rear end, wherein said first open front end is inclined with respect to a transverse direction and in particular which is not perpendicular to a direction of extension of said metal honeycomb structure.

5. The metal shock absorption element according to claim 4, wherein said metal shock absorption element comprises a plurality of notches made at said first open front end and in particular which are made on said first metal sheet which in particular is more external with respect to said second metal sheet.

6. The metal shock absorption element according to claim 1, wherein said metal shock absorption element comprises a metal fixing plate made integral, in particular welded or brazed, with said first metal sheet at a second rear end for fixing said second rear end of said metal shock absorption element to a chassis of a motor vehicle and in particular to a longitudinal beam of a vehicle.

7. The metal shock absorption element according to claim 1, wherein said first metal sheet and said second metal sheet are made of steel, in particular steel having two crystalline phases, a first martensitic phase and a second ferritic phase, preferably a type of steel having an elongation at break of substantially 7%, such as in particular a two-phase steel.

8. The metal shock absorption element according to claim 1, wherein said first metal sheet comprises at least one first sheared side having a profile shaped to create a plurality of metal fixing elements and preferably to create a plurality of notches, preferably said at least one sheared first side has a profile shaped to allow creation of said first open front end inclined with respect to a transverse direction and in particular which is not perpendicular to a direction of development of said metal honeycomb structure, to allow starting of a plurality of planned folds starting from said first open front end, preferably said second metal sheet comprises at least a second sheared side having a profile shaped to create said first open front end inclined with respect to said transverse direction and in particular to create a plurality of notches and/or preferably to create a plurality of metal fixing elements.

9. A bumper structure for a motor vehicle comprising at least two metal shock absorption elements according to claim 1, and further comprising a metal crosspiece having an essentially rectangular cross-section and formed by two "C"-shaped metal profiles welded together, and a bumper with polymeric outer casing, not shown in the figures, having only an aesthetic function to cover said metal crosspiece and said at least two metal shock absorption elements, preferably said metal crosspiece comprises two substantially flat base portions, each of which is fixed to or made integral with a corresponding first open front end of each metal shock absorption element, and in particular made integral in one piece with a plurality of metal fixing walls, avoiding direct fixing of said metal crosspiece, preferably said metal crosspiece comprises at each metal shock absorption element, one comprising a metal element having a substantially "Ω"-shaped cross-section welded or otherwise made integral inside said metal crosspiece to further stiffen said metal crosspiece in a localized zone.

10. An apparatus comprising a plurality of moulds for making a bumper structure according to claim 9.

11. A motor vehicle comprising at least one metal shock absorption element according to claim 1 and comprising a bumper structure including a metal crosspiece having an essentially rectangular cross-section and formed by two "C"-shaped metal profiles welded together, and a bumper with polymeric outer casing, not shown in the figures, having only an aesthetic function to cover said metal crosspiece and said at least two metal shock absorption elements, preferably said metal crosspiece comprises two substantially flat base portions, each of which is fixed to or made integral with a corresponding first open front end of each metal shock absorption element, and in particular made integral in one piece with a plurality of metal fixing walls, avoiding direct fixing of said metal crosspiece, preferably said metal crosspiece comprises at each metal shock absorption element, one comprising a metal element having a substantially "Ω"-shaped cross-section welded or otherwise made integral inside said metal crosspiece to further stiffen said metal crosspiece in a localized zone.

12. A production method for a metal shock absorption element according to claim 1 having a honeycomb structure, starting from a first metal sheet, and a second metal sheet, wherein the production method comprises the following steps: A) folding said first metal sheet preferably shaped a plurality of times, obtaining a first longitudinally open metal profile having a substantially "C"-shaped cross section and in particular having an open rectangular shape; B) folding said second metal sheet preferably shaped a plurality of times, obtaining a second longitudinally open metal profile having a substantially "C"-shaped cross-section and in particular having an open rectangular shape; C) inserting longitudinally said second metal profile inside said first metal profile, in particular within a first longitudinal channel of said first metal profile, in particular with a cross-section of said second metal profile rotated 180° with respect to a cross-section of said second metal profile; D) making integral in one piece said second metal sheet with said first metal sheet in particular in a plurality of points, which are preferably distributed along at least two opposite walls of said first metal sheet and said second metal sheet which face each other, and are in particular coupled to each other to produce a metal honeycomb structure having a closed cross-section and having a plurality of metal channels, in particular having at least three metal channels, wherein the method comprises a following step H1) of shaping said first metal sheet to obtain a first shaped metal sheet having along a first proximal end at least two metal fixing tabs and at least two diagonal lines; wherein said step H1 is carried out before said step A), to reduce production costs, and further comprises a step L1) of shaping said second metal sheet obtaining a second shaped metal sheet having along a first proximal end at least two diagonal lines; wherein said phase L1) is carried out before said phase B) to reduce production costs, wherein said step H1) comprises a step H2) of shearing said first metal sheet while simultaneously creating at least one metal fixing element for fixing a metal crosspiece and at least one notch, preferably adjacent to at least one metal fixing element, and wherein said step L1) comprises a step L2) of shearing said second metal sheet while simultaneously creating a plurality of diagonal lines to form a first open front end which is inclined with respect to the transverse direction, and a plurality of notches and/or preferably creating a plurality of metal fixing elements for said metal crosspiece.

13. The method according to claim 12, wherein said step D) comprises a step D1) of welding along a plurality of longitudinal directions in a plurality of points said first metal profile to said second metal profile, creating a metal shock absorption element in one piece and having a metal honeycomb structure comprising at least three longitudinal channels.

* * * * *